United States Patent [19]

Lowe

[11] Patent Number: 5,000,805
[45] Date of Patent: * Mar. 19, 1991

[54] METHOD FOR VACUUM FORMING COMPOSITE VEHICLE SEAT

[75] Inventor: Michael E. Lowe, Saline, Mich.

[73] Assignee: Hoover Universal, Inc., Ann Arbor, Mich.

[*] Notice: The portion of the term of this patent subsequent to Mar. 19, 2008 has been disclaimed.

[21] Appl. No.: 344,765

[22] Filed: Apr. 28, 1989

[51] Int. Cl.$^5$ ................ B32B 33/00; B29C 65/00
[52] U.S. Cl. .................................... 156/90; 156/285; 156/155; 264/46.8
[58] Field of Search ............... 156/286, 155, 90, 214, 156/285; 428/308.4; 264/46.8

[56] References Cited

U.S. PATENT DOCUMENTS 2,227,212 12/1940 Beck ................................ 156/90 X
4,692,199 9/1987 Kozlowski et al. ................ 156/245

Primary Examiner—Michael W. Ball
Assistant Examiner—Chester T. Barry
Attorney, Agent, or Firm—Harness, Dickey & Pierce

[57] ABSTRACT

A method for making a portion of a vehicle seat or back having a surface contour of predetermined shape by placing a sheet of an impermeable film against one side of a portion of a sheet of a permeable cloth fabric to make an impermeable composite portion of a fabric trim material. The composite portion is then positioned on a forming tool having a shaped upper surface complementary to the predetermined shape desired for the final product. A vacuum is then drawn between the forming tool and the impermeable composite portion so as to draw the portion into conformity with the shaped upper surface of the forming tool. A foam bun having an adhesive coated surface is then positioned against the portion on the forming tool. Heat is then applied to deteriorate the impermeable film thus enabling the adhesive to bond the cloth fabric material to the foam bun and maintain the desired shape.

3 Claims, 3 Drawing Sheets

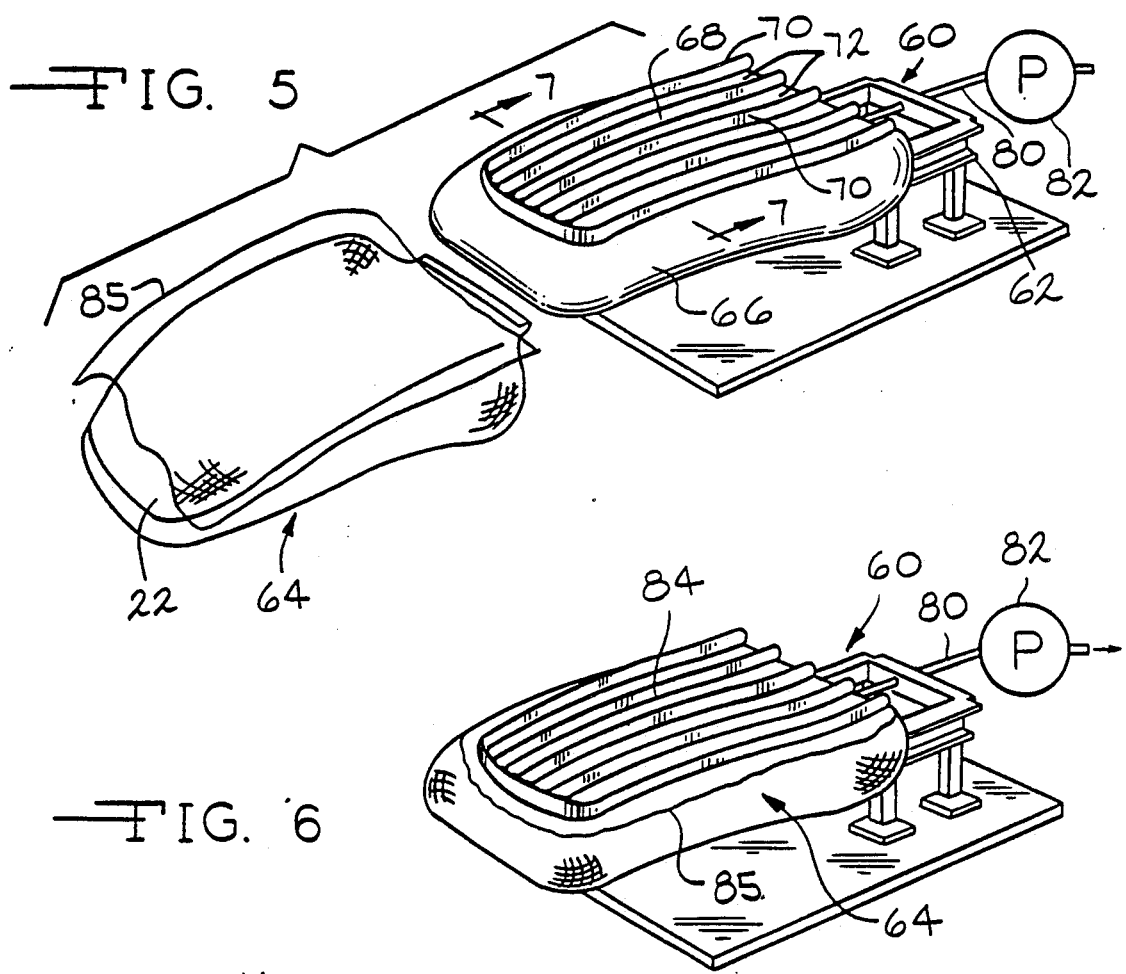

METHOD FOR VACUUM FORMING COMPOSITE VEHICLE SEAT

BACKGROUND AND SUMMARY OF THE INVENTION

This invention relates generally to automobile seats and more particularly to a method for forming a contoured portion of a vehicle seat or vehicle seat back having contoured styling features.

Various methods of bonding a breathable vehicle seat cover material to an underlying foam bun have been used to form contours or style lines in the surface of vehicle seats. One such method is disclosed in U.S. Pat. No. 4,692,199, issued to Kozlowski et al on Sept. 8, 1987.

The Kozlowski method comprises laying a cloth fabric on top of a contoured porous mold surface and overlaying the cloth fabric with an impermeable adhesive film. The film is physically secured and a vacuum is then drawn through the mold so as to cause the impervious film to draw the cloth fabric down into conformity with the contour of the mold surface. A foam pad is then compressed against the mold and the vacuum discontinued. Steam is then applied to heat and diffuse the adhesive film into the adjacent fabric layer and the foam pad to secure the two together. The adhesive film is not a part of the cloth fabric and therefore can gather during vacuum drawing such that wrinkles or creases in the adhesive film are created. These wrinkles can cause uneven adhesive thicknesses over the contoured surface. The uneven thickness can cause adhesive saturation of the fabric which can destroy the outer surface appearance of the fabric. Close visual scrutiny of the operation during the application of the adhesive film to the cloth fabric and to the foam bun or cushion pad is therefore required.

The method according to the present invention eliminates uneven adhesive thickness and minimizes the potential for adhesive breakthrough. The method according to the present invention comprises placing a sheet of air impermeable material such as a polyolefin film against a sheet of permeable cloth fabric to form an impermeable fabric composite. This impermeable fabric composite is then positioned on a forming tool having an upper surface having a shape complementary to the desired predetermined vehicle seat surface shape and having vacuum ports therein.

The fabric trim material composite is positioned over the forming tool with the cloth fabric against the upper shaped surface. A vacuum is drawn between the impermeable material composite and the upper surface of the forming tool. Atmospheric pressure then presses against the polyolefin sheet pressing the material into conformity with the contours of the upper surface of the tool. A foam bun with an adhesive on one face is then positioned against the material composite on the tool and heat is applied to the forming tool. The heat destroys the impermeable barrier created by evaporates the polyolefin film and enables the adhesive to contact the cloth fabric so as to adhere the bun to the fabric. This destruction of the impermeability of the film may be accomplished by evaporation, melting, vaporizing, deteriorating or other method.

The presence of the polyolefin film prevents excessive permeation of the cloth fabric with adhesive so as to preclude damage to the outer surface of the fabric. Excessive permeation of the cloth fabric with adhesive is prevented by removing an inherent limitation involved with the use of an impermeable adhesive film. If the adhesive film gathers and wrinkles or creases during vacuum drawing, the subsequent application of heat will result in the formation of a large amount of adhesive in place of the wrinkle or crease. This large amount of localized adhesive can cause saturation of the fabric and destroy the outer surface appearance of the fabric. The present invention avoids such a result by directly controlling and evenly applying the adhesive to the foam bun. Thus, the formation of a wrinkle or crease in the impermeable polyolefin film during the vacuum forming step of the present invention will not cause adhesive to saturate the cloth trim fabric and destroy the appearance of the fabric. The result is a readily repeatable process in which various style lines can be produced in vehicle seats having cloth covers which are permeable to enable the seat to breathe. Fabrics for such covers are also advantageous from a cost standpoint.

Further objects, features and advantages of the invention will become apparent from a consideration of the following description and the appended claims, when taken in connection with the accompanying drawing.

BRIEF DESCRIPTION OF THE DRAWINGS

FIG. 5 is an exploded assembly in perspective according to an alternative embodiment of the present invention wherein the forming tool is a cantilever supported assembly for forming a portion of a vehicle seat back;

FIG. 6 is a perspective view of the cover member and polyolefin sheet forming the composite installed on the forming tool and vacuum drawn into conformity with the shape of the upper surface contour of the forming tool;

FIG. 7 is a partial sectional view of the forming tool shown in FIGS. 5 and 6 taken along the line 7—7 in FIG. 5; and FIG. 8 is a perspective view of the completed vehicle seat back having the contoured portion formed in accordance with the present invention.

DETAILED DESCRIPTION OF THE INVENTION

Figure 1:
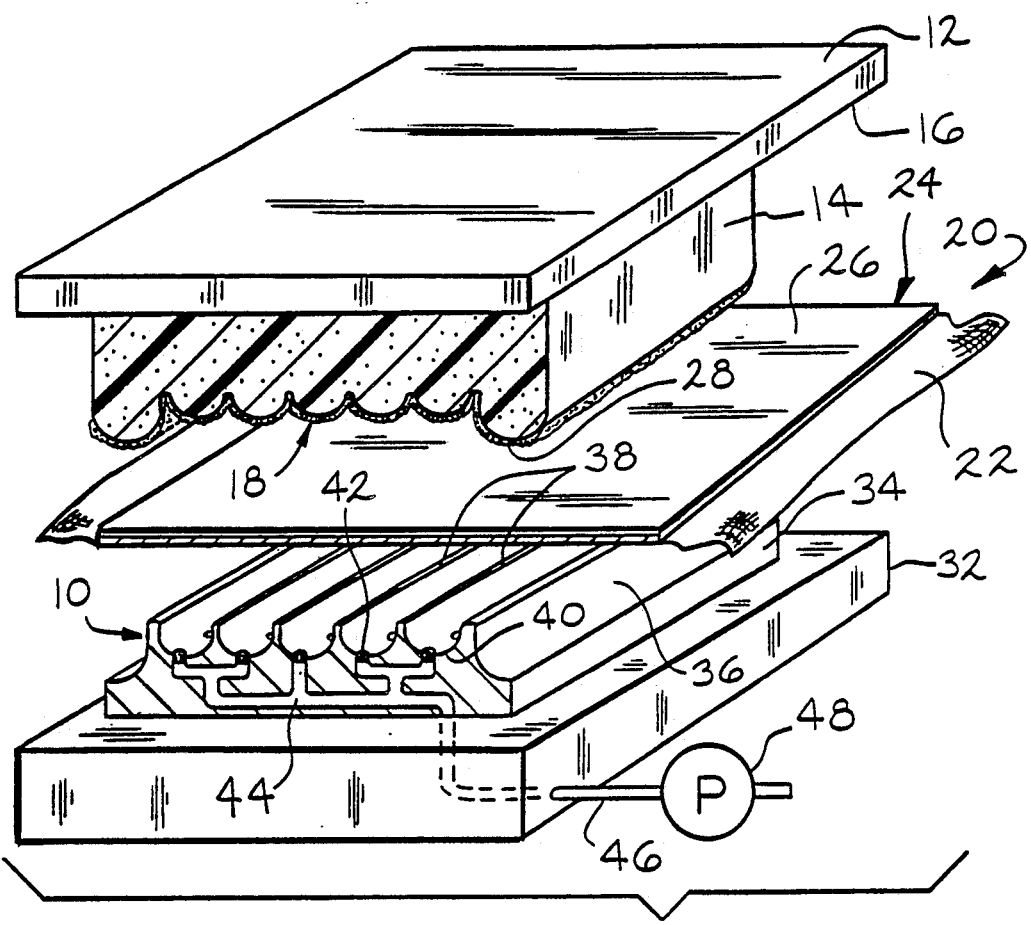
FIG. 1 is an exploded perspective view of one embodiment of the forming tool apparatus according to the present invention.

One forming tool apparatus for vacuum forming a portion of a cloth covered vehicle seat according to the present invention is illustrated in FIGS. 1 through 4. The apparatus comprises a vacuum forming tool fixture 10 and an upper platen 12. The forming tool 10 and upper platen 12 are relatively movable toward and away from each other. As shown in FIG. 1, a foam bun 14 is attached to the underside 16 of upper platen 12. Foam bun 14 has a shaped portion or surface 18 projecting downward towards forming tool 10. The shaped portion 18 is contoured to match the desired finished contour of the seat cushion assembly to be ultimately formed.

A cloth fabric trim material 20 is positioned between upper platen 12 and forming tool 10. The cloth fabric trim material 20 includes an impermeable composite sheet portion 24 formed by positioning an impermeable polyolefin sheet 26 against the back side of a breathable cloth fabric 22. This impermeable composite sheet portion 24 is shaped to complement the shaped portion 18 of foam bun 14 in accordance with the invention as described below.

The forming tool 10 includes a support structure 32 having mounted thereon a generally solid forming tool body 34 having a contoured or shaped upper surface 36 which forms a plurality of styling ribs 38 and alternating cavities or depressions 40 between adjacent ribs 38. The shaped upper surface 36 has a contour complementary to the desired end product surface contour.

Centrally located in cavities 40 are one or more vacuum ports 42 which are connected together via a passage 44 in body 34. The passage 44 in turn leads out of forming tool body 34 through a conduit 46 to a vacuum pump 48 which provides a negative pressure source. Alternatively, the body 34 of the forming tool 10 could also be formed of a generally porous material inset within an impermeable housing leaving one permeable upper surface exposed. The housing then would be connected to the vacuum pressure source 48.

The fabric trim material 20 is first placed on forming tool 10 with the outer cloth fabric 22 of the impermeable composite portion 24 engaging the upper surface 36 of forming tool 10. While the composite portion 24 of the trim material 20 is limited to a position corresponding to the upper surface 36 of the forming tool 10, the cloth fabric 22 may extend beyond the forming tool 10. The vacuum pump 48 is then operated to draw a vacuum between the impermeable composite portion 24 and shaped surface 36 so as to draw composite portion 24 into conformity with the shaped surface 36 as shown in FIG. 3.

Figure 3:
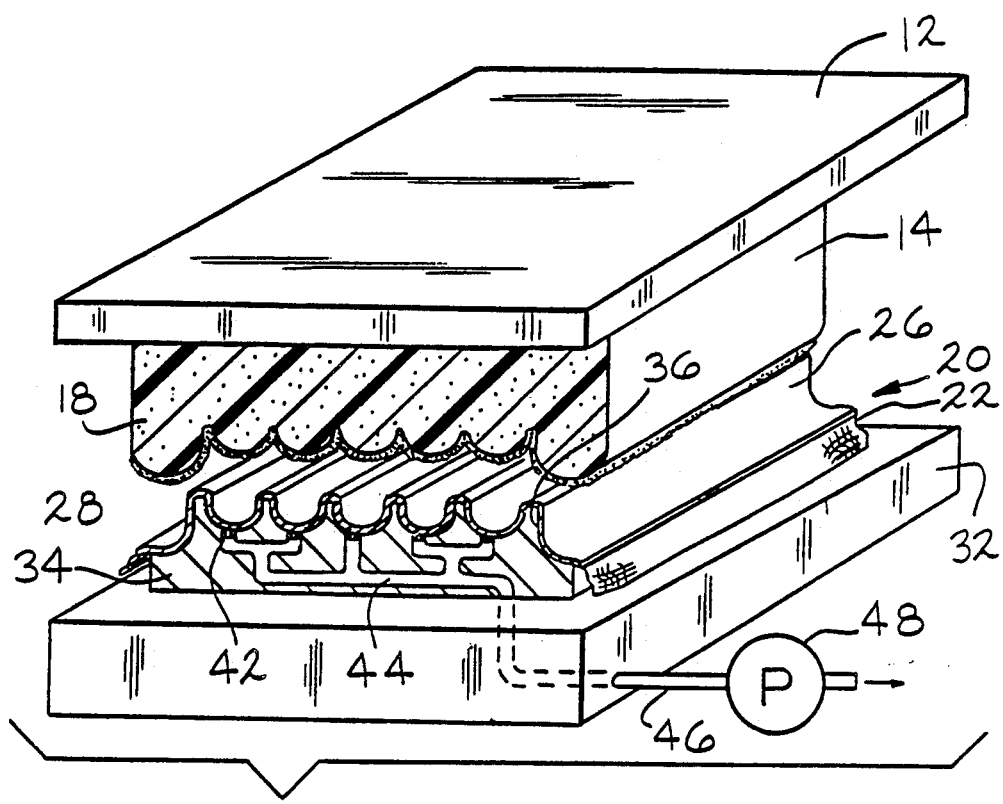
FIG. 3 is a partial perspective view of the apparatus of FIG. 1 with the composite sheet drawn against the forming tool by the application of a vacuum to draw the composite sheet down into comformity with the predetermined shape of the forming tool.

Shaped portion 18 of foam bun 14 has a contoured surface shape, as shown in FIGS. 1 and 3, which corresponds to the predetermined stylized shape of the portion of the vehicle seat being formed. An adhesive coating 28 for bonding bun 14 to composite portion 24 is applied to the shaped surface 18 of bun 14.

After a vacuum is drawn, as described above, to allow atmospheric pressure to push the polyolefin film 26 down toward surface 36 in turn drawing cloth fabric 22 against surface 36 of forming tool 10 as shown in FIG. 3, upper platen 12 is lowered positioning the shaped surface 18 of the foam bun 14 against the shaped composite portion 24 on forming tool 10.

Figure 2:
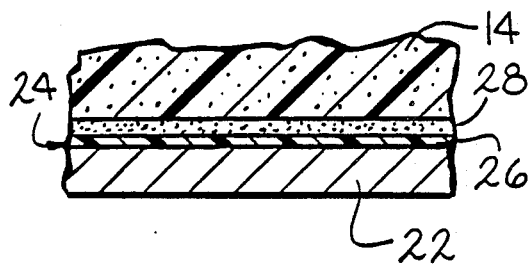
FIG. 2 is an enlarged fragmentary partial sectional view of the composite sheet sandwiched to the foam bun prior to the application of heat to the composite through the forming tool.
Figure 2A:
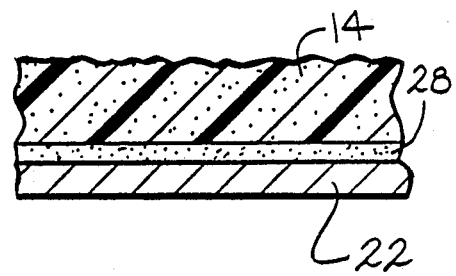
FIG. 2A is a fragmentary sectional view of the assembly shown in FIG. 2 after heating showing the foam bun and cloth cover adhesively secured together.

After the vacuum is released, a source of heat, such as stream, is then connected to conduit 46 so as to heat the forming tool 10 and the film 26 which causes the impermeable polyolefin film 26 to melt and evaporate or be otherwise destroyed, allowing the adhesive layer 28 to bond fabric 22 to bun 14. The partial sectional views of FIGS. 2 and 2A show the composite portion 24 against foam bun 14 before and after heat is applied to bond the foam bun 14 to the cloth fabric 22.

In addition, the presence of the impermeable film 26 permits a previously permeable cloth fabric 22 to be vacuum drawn into conformity with the desired end product shape. The evaporation of the impermeable barrier created by the polyolefin film 26 during the application of heat to bond the urethane foam bun 14 to the cloth fabric 22 causes the vehicle seat portion so formed to become breathable having a contoured surface which is pleasing in appearance and is comfortable to the occupant of the vehicle seat.

An alternative embodiment of the apparatus for forming a contour styled portion of a vehicle seat back according to the present invention is shown in FIGS. 5 through 8. In this alternative embodiment, the forming tool 60 is cantilever supported via a support structure 62 so that a tubular cover member 64, turned inside out, may be slipped onto forming tool 60 as shown in FIG. 6.

The forming tool 60 has a contoured body 66 having a contoured upper surface 68 similar to that of the forming tool 10 in the previously described preferred embodiment. The contoured upper surface 68 is shaped complementary to the desired shape of the end product vehicle seat back 74 as shown in FIG. 8. A partial sectional view through the forming tool 60 is shown in FIG. 7. The contoured upper surface 68 has a plurality of aligned style ribs 70 and alternating depressions 72. As in the previously described embodiment, the forming tool body 66 has a plurality of vacuum ports 76 disposed in the depressions 72 which are connected together via a passage 78. A conduit 80 is connected to one end of the passage 78 and leads to a vacuum pump source 82.

The cover member 64 is turned inside out so that the outer surface of the cover member is inside. This enables the front side of the cover member to be positioned against the forming surface 68. A sheet of polyolefin film 85 is then positioned against the cloth fabric 22 forming a composite portion 84 of the cover member 64. The cover member 64 is positioned with the composite portion 84 over surface 68 of forming tool 60. Portion 84 of the cover member 64 is then drawn down into the depressions 72 by energizing vacuum pump 82. The portion 84 is thus shaped complementary to upper surface 68 of forming tool 60.

Figure 4:
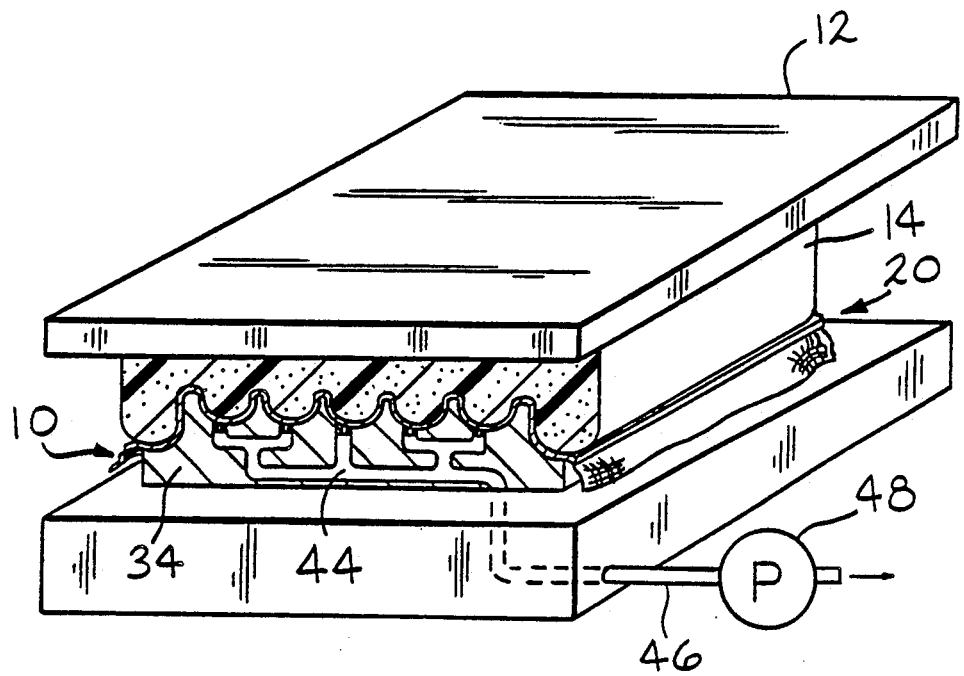
FIG. 4 is a partial perspective view of the assembly in FIG. 1 with the upper platen closed against the forming tool sandwiching the foam bun and the composite sheet therebetween.

A foam bun 14 having the stylized predetermined surface shape of the end product and an adhesive coating 28 thereon is then lowered against the portion 84 in a similar manner as is shown in FIG. 4 for the previously described embodiment. The foam bun 14 is pressed against the portion 84 on the tool 60. After the vacuum is released, the film 85 is heated by steam from conduit 80 to vaporize the film 85 and thereby enable bonding of the permeable cloth fabric 22 to the bun by the adhesive.

When the film 85 is evaporated, the cloth and bun become breathable. The foam bun 14 with the cover 64 attached is then removed from the forming tool 60 and the cover 64 is turned right side out so as to enclose the foam bun 14 forming the completed seat back as shown in FIG. 8.

Thus the method for forming the contoured portion of the vehicle seat or seat back according to the present invention includes the steps of:

a. placing a sheet of impermeable polyolefin film against a portion of a sheet of permeable cloth fabric to form an impermeable composite portion of a trim material;

b. placing the trim material on a forming tool fixture such as the forming tool 10 or 60 which has an upper surface shape complementary to the desired predetermined stylized shape with the cloth side of the composite portion being positioned against the contoured upper surface of the forming tool fixture;

c. drawing a vacuum between the composite portion and the tool surface so as to draw the composite portion against the surface to shape the composite into the predetermined desired shape;

d. applying an adhesive to a portion of the surface of the foam bun;

e. pressing the adhesive coated surface of the foam bun against the composite portion on the forming tool; and f. releasing the vacuum and applying heat to the film so as to deteriorate the film and thereby allow the adhesive to bond the permeable cloth to the bun and releasing the cloth and bun from the fixture to form a vehicle seat having the predetermined stylized shape.

It is to be understood that the invention is not limited to the exact construction or method illustrated and described, but that various changes and modifications may be made without departing from the spirit and scope of the invention as defined in the following claims.

What is claimed is:

1. In a method of forming a portion of a vehicle seat having a surface of predetermined shape, the steps of:

a. providing a sheet of air impermeable material which will deteriorate when heated;
   b. positioning said impermeable material on one side of a sheet of permeable cloth to form an air impermeable cloth fabric trim material;
   c. placing said trim material on a forming fixture having an upper surface complementary to said predetermined shape with the other side of said sheet of permeable cloth against said fixture;
   d. establishing a vacuum between said impermeable trim material and said fixture drawing said trim material against said surface to shape said trim material into said predetermined shape;
   e. providing a preshaped foam bun having a face of said predetermined shape;
   f. applying adhesive to said bun face;
   g. pressing said bun face against said shaped trim material on said fixture; and
   h. heating said trim material to deteriorate said air impermeable material to enable contact of said cloth with said adhesive such that said cloth is bonded to said bun face by said adhesive without said adhesive excessively permeating said cloth so as to impair the permeability and flexibility of the cloth.

2. The method according to claim 1 wherein said vacuum between said trim material and said fixture is established by providing vacuum passages in said fixture.

3. The method according to claim 2 wherein said trim material is heated by directing hot material through said vacuum passages into contact with said trim material after said vacuum has been released.

* * * * *